(12) United States Patent
Mruz (10) Patent No.: US 7,364,598 B2
(45) Date of Patent: Apr. 29, 2008

(54) METHOD OF MAKING AN ORIENTATION-INSENSITIVE ULTRA-WIDEBAND COUPLING CAPACITOR

(75) Inventor: John Mruz, East Northport, NY (US)

(73) Assignee: American Technical Ceramics Corporation, Huntington Station, NY (US)

( * ) Notice: Subject to any disclaimer, the term of this patent is extended or adjusted under 35 U.S.C. 154(b) by 0 days.

(21) Appl. No.: 11/637,558

(22) Filed: Dec. 12, 2006

(65) Prior Publication Data

US 2007/0084032 A1    Apr. 19, 2007

Related U.S. Application Data

(62) Division of application No. 10/940,266, filed on Sep. 14, 2004, now Pat. No. 7,248,458.

(51) Int. Cl.
*H01G 9/00* (2006.01)
*H01G 4/005* (2006.01)

(52) U.S. Cl. .................. 29/25.03; 29/25.42; 29/592.1; 361/303; 361/306.1

(58) Field of Classification Search .... 29/25.01–25.03, 29/25.35–25.42, 592.1, 609, 620; 361/523–528, 361/535–539, 321.1, 303, 306.1, 311, 328; 438/239, 244, 106; 257/296

See application file for complete search history.

(56) References Cited

U.S. PATENT DOCUMENTS

| | | | | |
|---|---|---|---|---|
| 4,419,714 A | * | 12/1983 | Locke | 361/321.2 |
| 4,870,746 A | * | 10/1989 | Klaser | 29/620 |
| 5,010,641 A | * | 4/1991 | Sisler | 29/830 |
| 5,576,926 A | * | 11/1996 | Monsorno | 361/303 |
| 6,605,127 B2 | * | 8/2003 | Narusawa | 29/25.03 |
| 6,631,551 B1 | * | 10/2003 | Bowles et al. | 29/620 |
| 6,690,572 B2 | * | 2/2004 | Liebowitz | 361/311 |
| 6,831,824 B1 | * | 12/2004 | Devoe et al. | 361/306.1 |
| 7,248,458 B2 | * | 7/2007 | Mruz | 361/303 |

* cited by examiner

*Primary Examiner*—Minh Trinh
(74) *Attorney, Agent, or Firm*—Mints, Levin, Cohn, Ferris, Glovsky and Popeo, P.C.

(57) ABSTRACT

A method of making an orientation-insensitive ultra-wideband coupling capacitor, including the steps of securing an unterminated multi-layer capacitor of a low frequency portion of the orientation-insensitive ultra-wideband coupling capacitor, coating completely the unterminated multi-layer capacitor of the low frequency portion with an adhesion layer having opposing ends, creating a circumferential slot around the adhesion layer and thereby electrically separating the opposing ends of the adhesion layer from each other thereby restoring capacitance and forming a slotted body, applying a solder dam coating to all surfaces defining the circumferential slot to protect the circumferential slot, and plating the opposing ends of the adhesion layer so as to form solderable connections and thereby form the orientation-insensitive ultra-wideband coupling capacitor.

16 Claims, 7 Drawing Sheets

METHOD OF MAKING AN ORIENTATION-INSENSITIVE ULTRA-WIDEBAND COUPLING CAPACITOR

1. CROSS REFERENCE TO RELATED APPLICATIONS

The instant application is a divisional of application Ser. No 10/940,266, filed on Sep. 14, 2004 now U.S. Pat. No. 7,248,458, which is issued on Jul. 24, 2007, entitled ORIENTATION-INSENSITIVE ULTRA-WIDEBAND COUPLING CAPACITOR AND METHOD OF MAKING, and incorporated herein by reference thereto.

2. BACKGROUND OF THE INVENTION

A. Field of the Invention

The embodiments of the present invention relate to a method of making an ultra-wideband coupling capacitor, and more particularly, the embodiments of the present invention relate to a method of making an orientation-insensitive ultra-wideband coupling capacitor.

B. Description of the Prior Art

To fully realize the accomplishment of the method of the embodiments of the present invention, it would be most beneficial to discuss the state of the art of the ultra-wideband coupling capacitors for which the orientation-insensitive ultra-wideband coupling capacitor produced by the method of the embodiments of the present invention surpasses.

Figure 1:
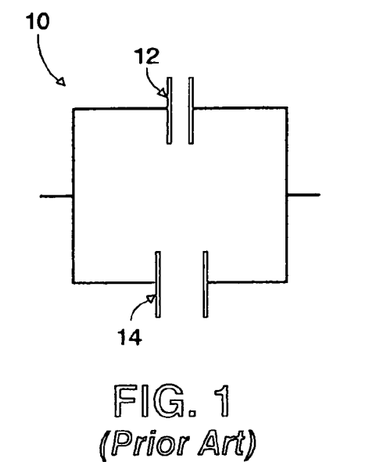
FIG. 1 is a schematic diagram of a prior art ultra-wideband coupling capacitor.
Figure 2:
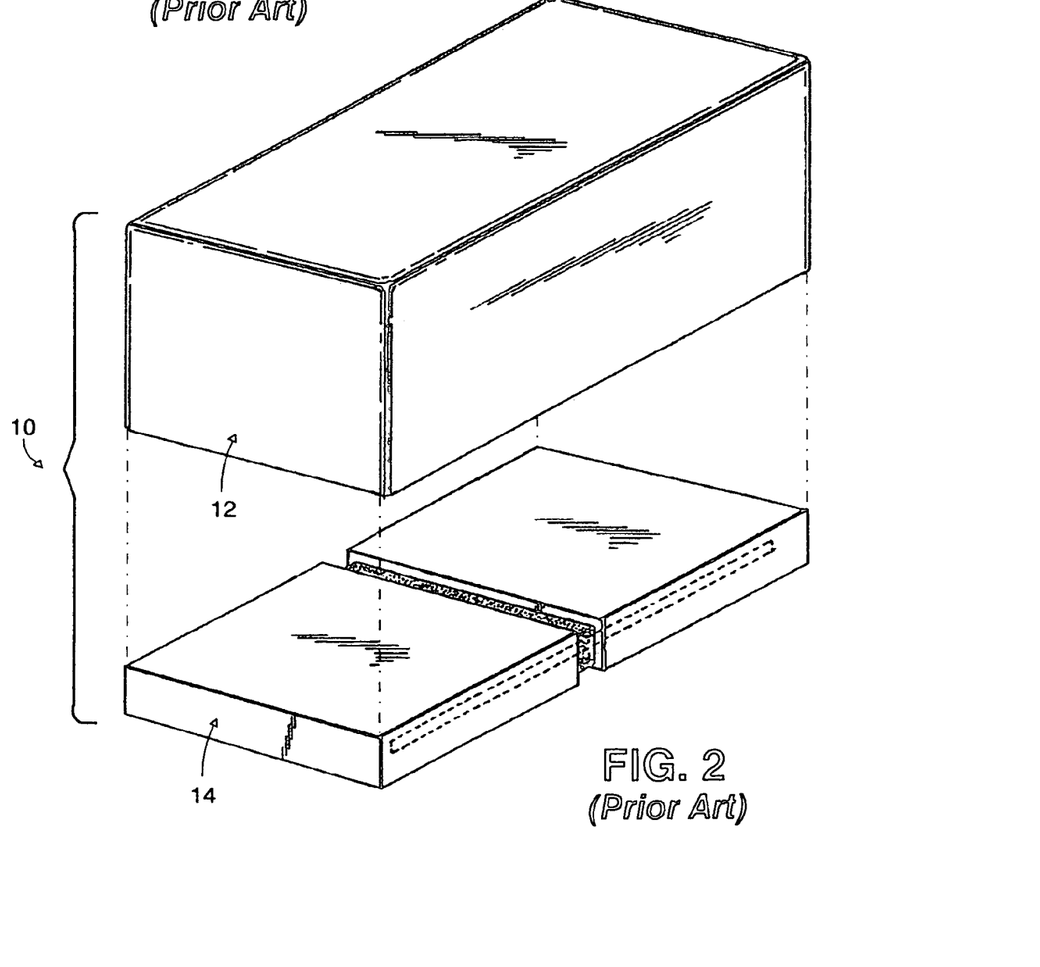
FIG. 2 is an exploded diagrammatic perspective view of a prior art ultra-wideband coupling capacitor.

As shown in FIGS. 1 and 2, which are, respectively, a schematic diagram of a prior art ultra-wideband coupling capacitor, and, an exploded diagrammatic perspective view of a prior art ultra-wideband coupling capacitor, a prior art ultra-wideband coupling capacitor 10 is a parallel combination of a high value capacitor 12, typically 10 nanofarads or greater, and a low value capacitor 14, typically 20 picofarads to 250 picofarads. As can be seen, capacitors in parallel result in wider operating bandwidths.

The prior art ultra-wideband coupling capacitor 10 is either composed of two or more physical items requiring precise assembly or a single ceramic assembly that must internally include complex multiple capacitor configurations, and via holes that interconnect internal electrodes to external contacting pads. Both of these family of devices have larger than desired physical footprints and can only be mounted on one specific side of the device making them difficult to use where surface mount technology (SMT) is employed. Electrically, size limitations result in both high insertion and return losses and also cause excessive surface moding at higher microwave frequencies.

The high value capacitor 12 is a multi-layer capacitor, while the low value capacitor 14 is generally either a single layer capacitor or two single layer capacitors in a balanced configuration. The multi-layer capacitor is a multi-layer structure with interdigitated plates, each separated by a thin dielectric layer, while the single layer capacitor is a single layer structure with two plates separated by a thin dielectric layer.

The high value capacitor 12, with its relatively low series resonance is most effective on low frequency signals, while the low value capacitor 14 with its relatively high series resonance is most effective on high frequency signals.

The high value capacitor 12 and the low value capacitor 14 of the prior art ultra-wideband coupling capacitor 10 have different operating characteristics in different portions of an ultra-wideband operating spectrum as will be discussed below.

Figure 3A:
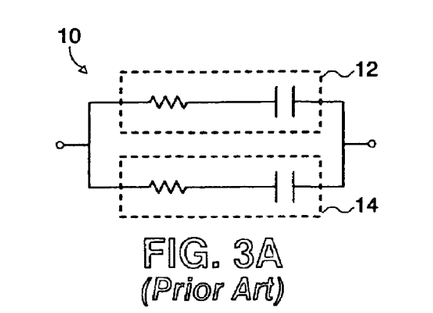
FIG. 3A is a schematic diagram of a prior art ultra-wideband coupling capacitor operating at a low frequency.

As shown in FIG. 3A, which is a schematic diagram of a prior art ultra-wideband coupling capacitor operating at a low frequency, when the prior art ultra-wideband coupling capacitor 10 is operating at a low frequency, the prior art ultra-wideband coupling capacitor 10 electrodes exhibit insignificant skin effect. The ceramic structure looks like a bulk dielectric.

Figure 3B:
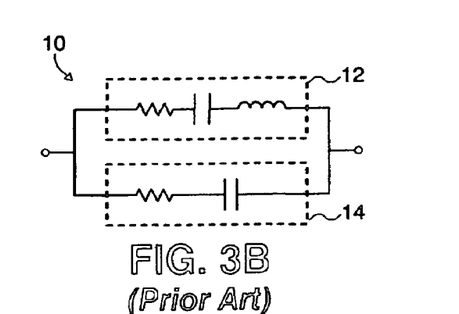
FIG. 3B is a schematic diagram of a prior art ultra-wideband coupling capacitor operating at a mid frequency.

As shown in FIG. 3B, which is a schematic diagram of a prior art ultra-wideband coupling capacitor operating at a mid frequency, when the prior art ultra-wideband coupling capacitor 10 is operating at a mid frequency, the prior art ultra-wideband coupling capacitor 10 electrodes exhibit significant skin effect. The dielectric region begins to take on the effect of a meandering parallel plate transmission line structure. Additional resonances emerge.

Figure 3C:
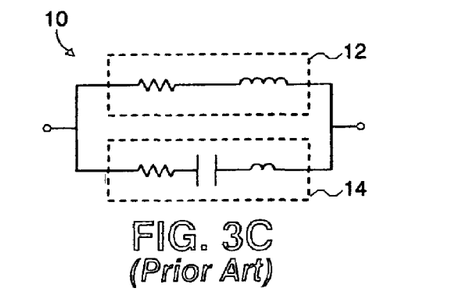
FIG. 3C is a schematic diagram of a prior art ultra-wideband coupling capacitor operating at a high frequency.

As shown in FIG. 3C, which is a schematic diagram of a prior art ultra-wideband coupling capacitor operating at a high frequency, when the prior art ultra-wideband coupling capacitor 10 is operating at a high frequency, the prior art ultra-wideband coupling capacitor 10 electrodes exhibit full skin effect. The dielectric region acts as a loosely meandering parallel plate transmission line. Additional resonances emerge at the higher frequencies.

The prior art ultra-wideband coupling capacitor 10 has a few associated shortcomings. Firstly, since the prior art ultra-wideband coupling capacitor 10 is a two-piece structure, the prior art ultra-wideband coupling capacitor 10 requires additional production assembly effort increasing per unit cost. Secondly, the prior art ultra-wideband coupling capacitor 10 is orientation-sensitive restricting it to being mounted only on one specific surface creating surface mount technology (SMT) compatibility issues. Thirdly, the assembly height of the prior art ultra-wideband coupling capacitor 10 exceeds the 0.020" dimension of a standard 0402 package by 0.012".

Thus, there exists a need for an ultra-wideband coupling capacitor which is one-piece and thereby eliminates additional production assembly effort thereby decreasing per unit cost, which is orientation-insensitive and thereby eliminates restricting it to being mounted only on one specific surface thereby eliminating surface mount technology (SMT) compatibility issues, and which does not exceed the 0.020" dimension of a standard 0402.

Numerous innovations for high frequency capacitors have been provided in the prior art, which will be discussed below in chronological order to show advancement in the art, and which are incorporated herein by reference thereto. Even though these innovations may be suitable for the specific individual purposes to which they address, they each differ in structure, and/or operation, and/or purpose from the embodiments of the present invention.

(1) U.S. Pat. No. 5,576,926 to Monsorno.

U.S. Pat. No. 5,576,926 to Monsorno has an assignee common with the instant application and presents a capacitor having a superior ability to operate in the upper regions of the RF spectrum. The capacitor includes a planar electrode layer that is mounted between a pair of dielectric layers. The electrode layer generally is centered inwardly with respect to the dielectric layers leaving an outward margin of dielectric material. One of the dielectric layers has two spaced-apart contact members, each having a different polarity from the other. The electrode layer is isolated from electrical contact with any conductor and is buried within the dielectric layers. The electrode layer in combination with the dielectric layer on which the contact members are mounted and the contact members allow development of a selected value of capacitance between the contact members. Providing trimmed contact members, as well as controlling their size and spacing, allow for convenient preselection of desired operative characteristics of the capacitor. The contact members could be positioned on a substrate to which a buried electrode is mounted.

(2) U.S. Pat. No. 6,690,572 to Liebowitz.

U.S. Pat. No. 6,690,572 to Liebowitz teaches an SLC having a thin brittle ceramic dielectric layer less than 0.0035 inches thick and as low as 0.0005 inches or less. Electrodes are thick and strong enough, either singly or together, to give the structure required physical strength for manufacture, handling, and usage. Electrodes are either a ceramic metal composite, a porous ceramic infiltrated with metal or other conductive material, a resin filled with metal or other conductive material, or combinations of the above. The very thin and in itself fragile dielectric layer provides exceedingly high capacity per unit area with temperature stability and low losses. A 0.00001-inch thick dielectric of titanium dioxide is also used.

It is apparent that numerous innovations for high frequency capacitors have been provided in the prior art that are adapted to be used. Furthermore, even though these innovations may be suitable for the specific individual purposes to which they address, they would not be suitable for the purposes of the embodiments of the present invention as heretofore described.

3. SUMMARY OF THE INVENTION

Thus, an object of the embodiments of the present invention is to provide a method of making an orientation-insensitive ultra-wideband coupling capacitor that avoids the disadvantages of the prior art.

Another object of the embodiments of the present invention is to provide a method of making an orientation-insensitive ultra-wideband coupling capacitor having improved electrical performance over that of the prior art.

Still another object of the embodiments of the present invention is to provide a method of making an orientation-insensitive ultra-wideband coupling capacitor having more attractive physical/mechanical characteristics than that of the prior art.

Yet another object of the embodiments of the present invention is to provide a method of making an orientation-insensitive ultra-wideband coupling capacitor that is one-piece and thereby has inherently higher reliability and eliminates additional production assembly effort thereby decreasing per unit cost.

Still yet another object of the embodiments of the present invention is to provide a method of making an orientation-insensitive ultra-wideband coupling capacitor that is smaller than a two-piece prior art ultra-wideband coupling capacitor and thereby consumes less space and reduces the propensity to launch surface modes.

Yet still another object of the embodiments of the present invention is to provide a method of making an orientation-insensitive ultra-wideband coupling capacitor that is orientation-insensitive and thereby eliminates restricting it to being mounted only on one specific surface thereby eliminating surface mount technology (SMT) compatibility issues, i.e., operates equally well regardless of the surface used to mount it.

Still yet another object of the embodiments of the present invention is to provide a method of making an orientation-insensitive ultra-wideband coupling capacitor not requiring special orientation during tape-and-reel loading.

Yet still another object of the embodiments of the present invention is to provide a method of making an orientation-insensitive ultra-wideband coupling capacitor not exceeding the 0.020" dimension of standard 0402 so as to form a true 0402 package that can be handled with standard SMT equipment.

Still yet another object of the embodiments of the present invention is to provide a method of making an orientation-insensitive ultra-wideband coupling capacitor that is electrically identical to a two-piece prior art ultra-wideband coupling capacitor.

Yet still another object of the embodiments of the present invention is to provide a method of making an orientation-insensitive ultra-wideband coupling capacitor having lower insertion loss than a two-piece prior art ultra-wideband coupling capacitor.

Still yet another object of the embodiments of the present invention is to provide a method of making an orientation-insensitive ultra-wideband coupling capacitor having better VSWR than a two-piece prior art ultra-wideband coupling capacitor.

Yet still another object of the embodiments of the present invention is to provide a method of making an orientation-insensitive ultra-wideband coupling capacitor having volumetrically efficient apparatus for enclosing a functional RF component within a gapped low-loss conductor pair, each of which surrounds the RF component on four sides- and is co-terminal with it on a remaining two sides.

Briefly stated, still another object of the embodiments of the present invention is to provide a method of making an orientation-insensitive ultra-wideband coupling capacitor, including the steps of securing an unterminated multi-layer capacitor of a low frequency portion of the orientation-insensitive ultra-wideband coupling capacitor, coating completely the unterminated multi-layer capacitor of the low frequency portion with an adhesion layer having opposing ends, creating a circumferential slot around the adhesion layer and thereby electrically separating the opposing ends of the adhesion layer from each other restoring capacitance and forming a slotted body, applying a solder dam coating to all surfaces defining the circumferential slot to protect the circumferential slot, and plating the opposing ends of the adhesion layer so as to form solderable connections and thereby form the orientation-insensitive ultra-wideband coupling capacitor.

The novel features considered characteristic of the embodiments of the present invention are set forth in the appended claims. The embodiments of the present invention themselves, however, both as to their construction and to their method of operation together with additional objects and advantages thereof will be best understood from the following description when read and understood in connection with the accompanying drawings.

4. BRIEF DESCRIPTION OF THE DRAWINGS

The figures of the drawings are briefly described as follows.

5. LIST OF REFERENCE NUMERALS UTILIZED IN THE DRAWINGS

A. Prior Art
10 prior art ultra-wideband coupling capacitor
12 high value capacitor of prior art ultra-wideband coupling capacitor 10
14 low value capacitor of prior art ultra-wideband coupling capacitor 10

B. Method of Embodiments of Present Invention
20 orientation-insensitive ultra-wideband coupling capacitor of method of embodiments of present invention
22 plurality of external surfaces
24 low frequency portion
26 high frequency portion
28 unterminated multi-layer capacitor of low frequency portion 24
29 external surfaces of unterminated multi-layer capacitor 28 of low frequency portion 24
30 electrode layers of unterminated multi-layer capacitor 28 of low frequency portion 24
32 dielectric layers of unterminated multi-layer capacitor 28 of low frequency portion 24
34 first ends of electrode layers 30 of unterminated multi-layer capacitor 28 of low frequency portion 24
36 opposing ends of external surfaces 29 of unterminated multi-layer capacitor 28 of low frequency portion 24
38 second ends of electrode layers 30 of unterminated multi-layer capacitor 28 of low frequency portion 24
40 pair of conductors of high frequency portion 26
42 circumferential slot between pair of conductors 40 of high frequency portion 26
46 exposed opposing ends of plurality of external surfaces of orientation-insensitive ultra-wideband coupling capacitor 20 of method of embodiments of present invention
48 quick curing protective UV-curable solder dam coating
50 plating
51 solderable connections
52 adhesion layer
54 opposing ends of adhesion layer 52
56 slotted body

6. DETAILED DESCRIPTION OF THE PREFERRED EMBODIMENTS

A. The Orientation-Insensitive Ultra-Wideband Coupling Capacitor 20

To fully realize the accomplishment of the method of the embodiments of the present invention, it would be most beneficial to discuss the orientation-insensitive ultra-wideband coupling capacitor produced by the method of the embodiments of the present invention surpasses.

Figure 4:
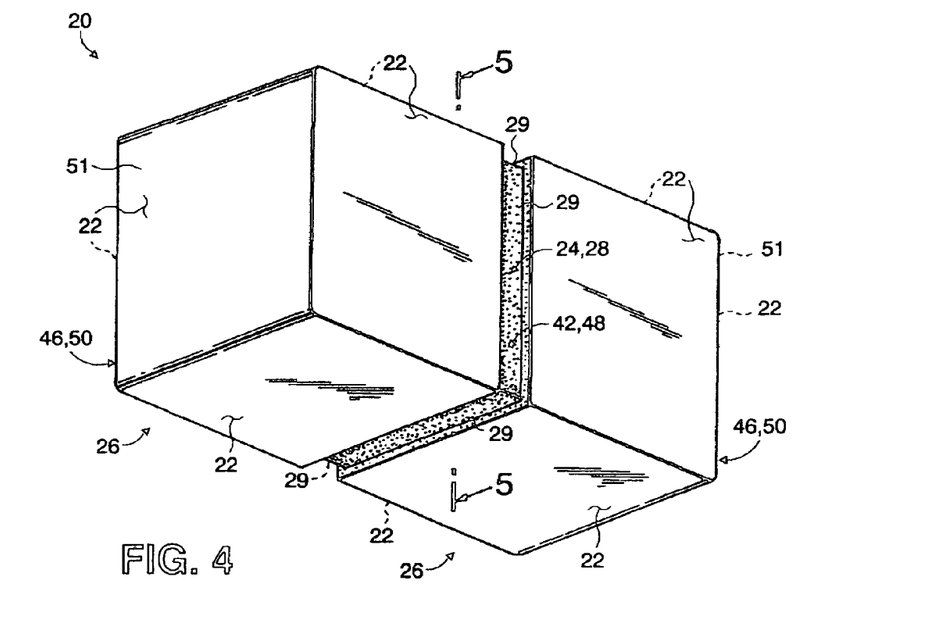
FIG. 4 is a diagrammatic perspective view of an orientation-insensitive ultra-wideband coupling capacitor made by the method of the embodiments of the present invention.
Figure 5:
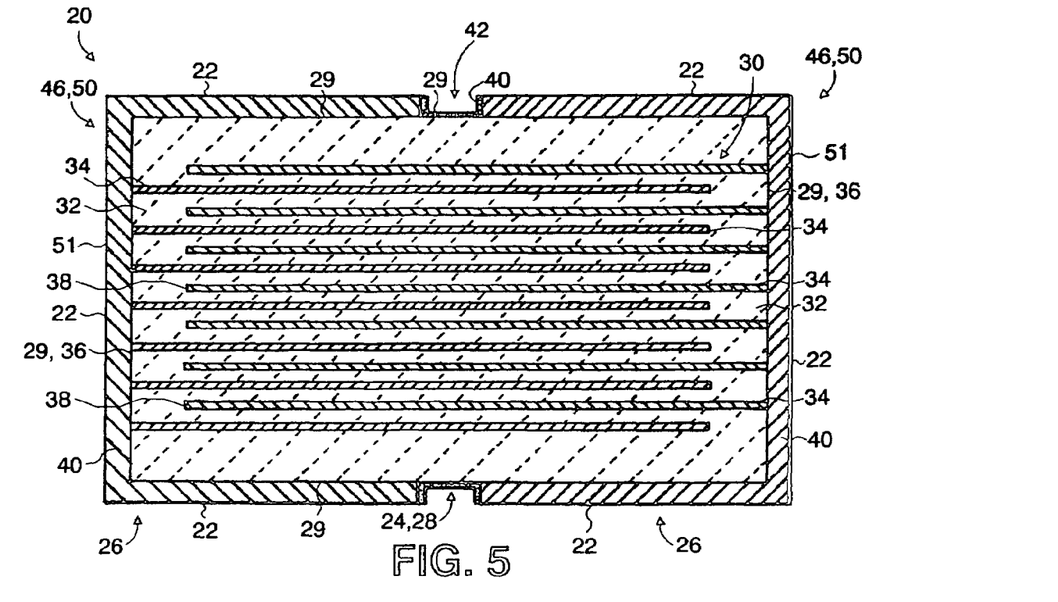
FIG. 5 is a diagrammatic cross sectional view taken along LINE 5-5 in FIG. 4.

Referring now to the figures, in which like numerals indicate like parts, and particularly to FIGS. 4 and 5, which are, respectively, a diagrammatic perspective view of an orientation-insensitive ultra-wideband coupling capacitor made by the method of the embodiments of the present invention, and, a diagrammatic cross sectional view taken along LINE 5-5 in FIG. 4, the orientation-insensitive ultra-wideband coupling capacitor of the method of the embodiments of the present invention is shown generally at 20.

The orientation-insensitive ultra-wideband coupling capacitor 20 typically operates in a range from below 20 KHz to over 40 GHz, and fills a need for better blocking and decoupling components by finding a use in almost all ultra-wideband digital signal processing applications, e.g., optical systems and their associated test equipment, closely related DC returns and bias tees, fiber to the home (FTTI), and MMI C development, e.g., amplifiers, e.g, ultra-wideband MMIC amplifiers and those using related technology.

The orientation-insensitive ultra-wideband coupling capacitor 20 comprises a plurality of external surfaces 22, a low frequency portion 24, and a high frequency portion 26. The high frequency portion 26 is so disposed on and electrically connected to the low frequency portion 24 so as to allow the orientation-insensitive ultra-wideband coupling capacitor 20 to work identically when mounted on any external longitudinal surface of the plurality of external surfaces 22 thereof and thereby be readily SMT compatible without regard to special orienting procedures.

The orientation-insensitive ultra-wideband coupling capacitor 20 can operate below 16 KHz by using a larger value for the low frequency portion 24 than that used for the range from below 20 KHz to over 40 GHz discussed above.

The low frequency portion 24 is functionally equivalent to the high value capacitor 12 of the prior art ultra-wideband coupling capacitor 10, e.g., a single layer capacitor, while the high frequency portion 26 is functionally equivalent to the low value capacitor 14 of the prior art ultra-wideband coupling capacitor, e.g., a single-layer capacitor, so as to allow the orientation-insensitive ultra-wideband coupling capacitor 20 to have functions of both the high value capacitor 12 and the low value capacitor 14 solely in a single multi-layer ceramic body.

The low frequency portion 24 is an unterminated multi-layer capacitor 28 having external surfaces 29, electrode layers 30, and dielectric layers 32, and preferably being 10 nF or higher. The dielectric layers 32 of the unterminated multi-layer capacitor 28 of the low frequency portion 24 alternate with the electrode layers 30 of the unterminated multi-layer capacitor 28 of the low frequency portion 24. The electrode layers 30 of the unterminated multi-layer capacitor 28 of the low frequency portion 24 extend at first ends 34 thereof from and are open for external electrical communication from opposing ends 36 of the external surfaces 29 of the unterminated multi-layer capacitor 28 of the low frequency portion 24 to second ends 38 thereof alternatingly stopping short of the opposing ends 36 of the external surfaces 29 of the unterminated multi-layer capacitor 28 of the low frequency portion 24 opposite to that from which they extend so as not to be open for external electrical communication therefrom.

The high frequency portion 26 is a pair of conductors 40. The pair of conductors 40 of the high frequency portion 26 cover the opposing ends 36 of the external surfaces 29 of the unterminated multi-layer capacitor 28 of the low frequency portion 24, respectively, and extend therefrom over the external surfaces 29 of the unterminated multi-layer capacitor 28 of the low frequency portion 24 to just short of each other so as to form a circumferential slot 42 therebetween and be separate from each other. The circumferential slot 42 is preferably formed by laser scribing, but can be formed by either chemical etching, mechanical abrasing, or any similar procedure. Because the high frequency portion 26 does not employ additional internal electrodes with separating layers, i.e., does not employ a composite internal interdigital electrode array as a single floating electrode that is coupled to the pair of conductors 40 of the high frequency portion 26, there is less insertion and return losses.

The pair of conductors 40 of the high frequency portion 26 form the plurality of external surfaces 22 and electrically communicate with the first ends 34 of the electrode layers 30 of the unterminated multi-layer capacitor 28 of the low frequency portion 24 associated therewith so as to allow the orientation-insensitive ultra-wideband coupling capacitor 20 to work identically when mounted on any external longitudinal surface of the plurality of external surfaces 22 thereof. A set of coupled transmission lines is formed on the plurality of external surfaces 22 between the pair of conductors 40 of the high frequency portion 26 and the electrode layers 30 contained in the unterminated multi-layer capacitor 28 of the low frequency portion 24 so as to allow low frequency energy to pass through the low frequency portion 24, which is centrally located, and to allow high frequency energy to pass through the high frequency portion 26, which is peripherally located.

The pair of conductors 40 of the high frequency portion 26 preferably comprise titanium-tungsten (TiW) followed by nominally three microns of copper (Cu) and a gold (Au) flash.

The circumferential slot 42 is preferably nominally 1.5 mi wide, is constantly maintained completely through and completely around the high frequency portion 26 without destroying the unterminated multi-layer capacitor 28 of the low frequency portion 24, and is disposed substantially midway between exposed opposing ends 46 of the plurality of external surfaces 22 of the orientation-insensitive ultra-wideband coupling capacitor 20, thereby electrically separating the exposed opposing ends 46 of the orientation-insensitive ultra-wideband coupling capacitor 20 from each other, and thereby restoring capacitance thereto.

The orientation-insensitive ultra-wideband coupling capacitor 20 further comprises a quick curing protective UV-curable solder dam coating 48. The quick curing protective UV-curable solder dam coating 48 covers all surfaces defining the circumferential slot 42 to protect the circumferential slot 42.

The orientation-insensitive ultra-wideband coupling capacitor 20 further comprises a plating 50. The plating 50 covers the exposed opposing ends 46 of the plurality of external surfaces 22 of the orientation-insensitive ultra-wideband coupling capacitor 20 so as to form solderable connections 51 extending up to the protective UV-curable solder dam coating 48 acting as a stop-off barrier for the solderable connections 51. The orientation-insensitive ultra-wideband coupling capacitor 20 is thereby formed having a resistance across the solderable connections 51 increased so that it exceeds 100 MegOhms. The plating 50 is preferably either pure tin or solder or gold. When the plating 50 is gold, the solderable connections 51 can also be gold/ribbon bonded or epoxy bonded.

Figure 6:
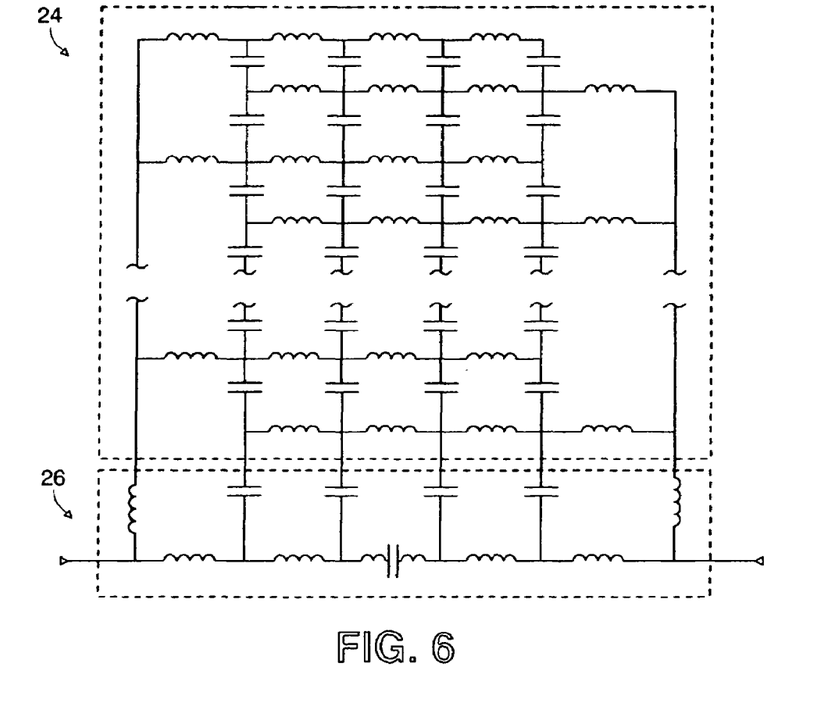
FIG. 6 is a circuit equivalent to an orientation-insensitive ultra-wideband coupling capacitor made by the method of the embodiments of the present invention.

A circuit equivalent to the orientation-insensitive ultra-wideband coupling capacitor 20 can best be seen in FIG. 6, which is a circuit equivalent to an orientation-insensitive ultra-wideband coupling capacitor made by the method of the embodiments of the present invention.

It is to be understood that even though the embodiment given is for a low frequency capacitor within a high frequency capacitor, it is not limited to that combination in that generically an embodiment includes a volumetrically efficient apparatus for enclosing a functional RF component within a gapped low-loss conductor pair. Each of the pair of low-loss conductors surrounds the RF component on four sides and is co-terminal with the RF component on a remaining two sides. A gap formed between the conductor pair creates a low-loss capacitor that is in parallel with the surrounded RF component. The surrounded RF component may include, but is not limited to, either a multi-layer capacitor, an inductor, a resister, other resonance circuitry, a filter, a transmission line, or a plurality of transmission lines. The resultant overall device includes, but is not limited to, volumetrically efficient high-performing parallel combinations of two capacitors, of an inductor and a capacitor creating thereby a parallel resonant network, a resistor, other resonance circuitry and a capacitor or a so-called R-C network, a filter and a capacitor creating thereby a filter with an additional pole or coupling, a transmission line and a capacitor, or a plurality of transmission lines and a capacitor.

B. The Method of Making the Orientation-Insensitive Ultra-Wideband Coupling Capacitor 20

The method of making the orientation-insensitive ultra-wideband coupling capacitor 20 can best be seen in FIGS. 7A-7D, which are a flow chart of the method of making the orientation-insensitive ultra-wideband coupling capacitor of the embodiments of the present invention, and as such, will be discussed with reference thereto.

Figure 7:
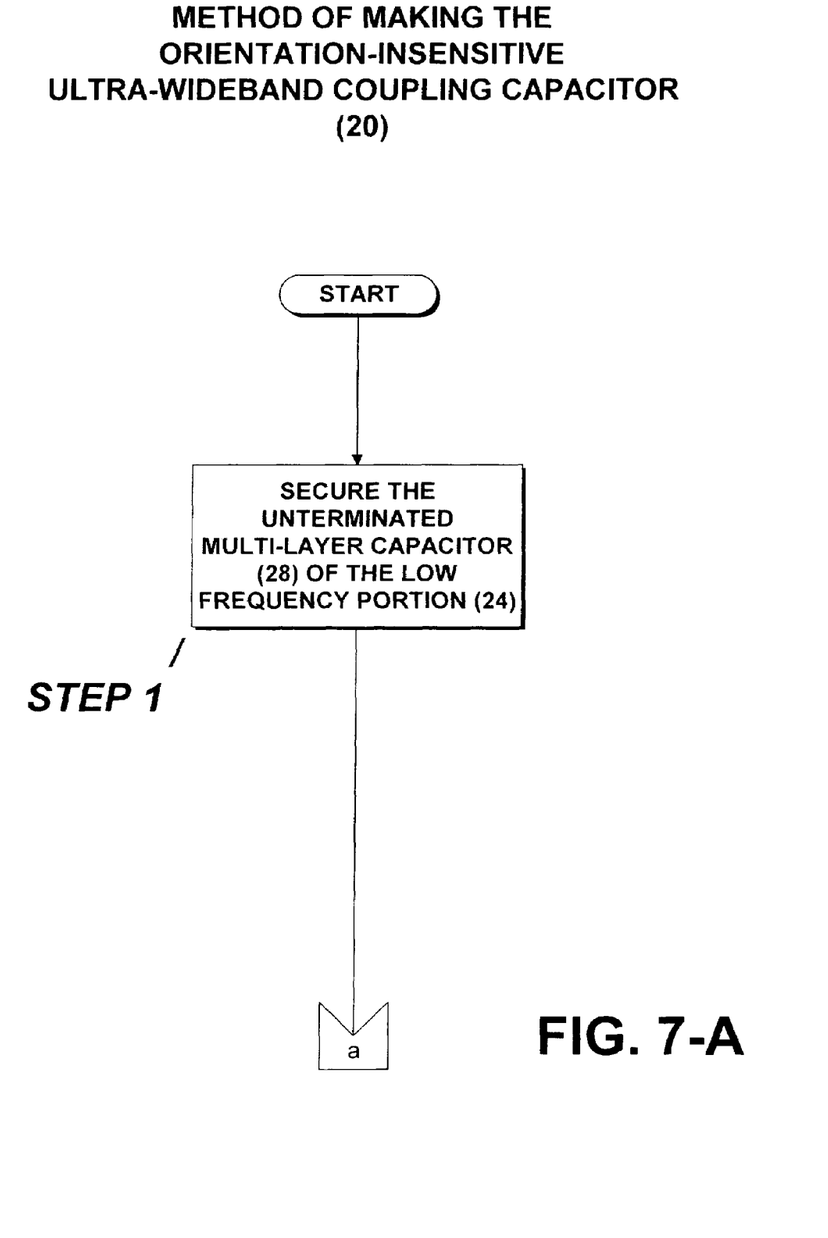
FIGS. 7A-7D are a flow chart of the method of making the orientation-insensitive ultra-wideband coupling capacitor of the embodiments of the present invention.

The method of making the orientation-insensitive ultra-wideband coupling capacitor 20 comprises the following steps:

STEP 1: Secure the unterminated multi-layer capacitor 28 of the low frequency portion 24.

STEP 2: Coat completely the unterminated multi-layer capacitor 28 of the low frequency portion 24 with titanium-tungsten (TiW) followed by nominally three microns of copper (Cu) and a gold (Au) flash so as to form an adhesion layer 52 having opposing ends 54.

STEP 3: Create by either laser scribing, chemical etching, mechanical abrasing, or similar procedure the circumferential slot 42 nominally 1.5 mil wide, completely through, completely around, and maintained constantly in, the adhesion layer 52 without destroying the unterminated multi-layer capacitor 28 of the low frequency portion 24, and substantially midway between the opposing ends 54 of the adhesion layer 52, thereby electrically separating the opposing ends 54 of the adhesion layer 52 from each other, and thereby restoring capacitance thereto and forming a slotted body 56.

STEP 4: Soak prolongingly the slotted body 56 in highly diluted hydrogen peroxide if the circumferential slot 42 was laser scribed to eliminate a residue film of vaporized metal redeposited into the circumferential slot 42 after laser scribing.

STEP 5: Apply the quick curing protective UV-curable solder dam coating 48 to all surfaces defining the circumferential slot 42 to protect the circumferential slot 42.

STEP 6: Plate the opposing ends 54 of the adhesion layer 52 with either pure tin or solder or gold so as to form solderable connections 51 up to the quick curing protective UV-curable solder dam coating 58 acting as a stop-off barrier for the solderable connections 51, and thereby form the orientation-insensitive ultra-wideband coupling capacitor 20 having a resistance across the solderable connections 51 increased so that it exceeds 100 MegOhms as a result of the soak step if carried out. The plating 50 is preferably either pure tin or solder or gold.

C. The Conclusions

It will be understood that each of the elements described above or two or more together may also find a useful application in other types of constructions differing from the types described above, The embodiments of the present invention have been illustrated and described as embodied in a method of making an orientation-insensitive ultra-wideband coupling capacitor, however, they are not limited to the details shown, since it will be understood that various omissions, modifications, substitutions, and changes in the forms and details of the embodiments of the present invention illustrated and their operation can be made by those skilled in the art according to knowledge in the art without departing from the spirit of the embodiments of the present invention.

Without further analyses, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A method of making an orientation-insensitive ultra-wideband coupling capacitor, comprising the steps of:
   a) securing an unterminated multi-layer capacitor of a low frequency portion of the orientation-insensitive ultra-wideband coupling capacitor;
   b) coating completely the unterminated multi-layer capacitor of the low frequency portion with an adhesion layer having opposing ends,
   c) creating a circumferential slot around the adhesion layer and thereby electrically separating the opposing ends of the adhesion layer from each other thereby restoring capacitance and forming a slotted body;
   d) applying a solder dam coating to all surfaces defining the circumferential slot to protect the circumferential slot; and
   e) plating the opposing ends of the adhesion layer so as to form solderable connections and thereby form the orientation-insensitive ultra-wideband coupling capacitor.

2. The method as defined in claim 1, further comprising the step of soaking the slotted body if said circumferential slot was created by laser scribing to eliminate a residue film of vaporized metal redeposited into the circumferential slot after the laser scribing.

3. The method as defined in claim 1, further comprising the step of soaking prolongingly the slotted body if said circumferential slot was created by laser scribing to eliminate a residue film of vaporized metal redeposited into the circumferential slot after the laser scribing.

4. The method as defined in claim 1, further comprising the step of soaking the slotted body in highly diluted hydrogen peroxide if said circumferential slot was created by laser scribing to eliminate a residue film of vaporized metal redeposited into the circumferential slot after the laser scribing step.

5. The method as defined in claim 1, wherein said coating step includes coating completely the unterminated multi-layer capacitor of the low frequency portion with titanium-tungsten.

6. The method as defined in claim 1, wherein said coating step includes coating completely the unterminated multi-layer capacitor of the low frequency portion with titanium-tungsten followed by copper.

7. The method as defined in claim 1, wherein said coating step includes coating completely the unterminated multi-layer capacitor of the low frequency portion with titanium-tungsten followed by nominally three microns of copper.

8. The method as defined in claim 1, wherein said coating step includes coating completely the unterminated multi-layer capacitor of the low frequency portion with titanium-tungsten followed by copper and a gold flash.

9. The method as defined in claim 1, wherein said creating step includes laser scribing a circumferential slot.

10. The method as defined in claim 1, wherein said creating step includes creating a circumferential slot nominally 1.5 mil wide.

11. The method as defined in claim 1, wherein said creating step includes creating a circumferential slot maintained constantly in, completely through, and completely around, the adhesion layer.

12. The method as defined in claim 1, wherein said creating step includes creating a circumferential slot substantially midway between the opposing ends of the adhesion layer.

13. The method as defined in claim 1, wherein said applying step includes applying a quick curing protective UV-curable solder dam coating to all surfaces defining the circumferential slot to protect the circumferential slot.

14. The method as defined in claim 1, wherein said plating step includes plating the opposing ends of the adhesion layer with one of pure tin, solder, and gold so as to form solderable connections.

15. The method as defined in claim 13, wherein said plating step includes plating the opposing ends of the adhesion layer so as to form solderable connections up to the quick curing protective UV-curable solder dam coating acting as a stop-off barrier for the solderable connections.

16. The method as defined in claim 1, wherein said creating step includes one of laser-scribing, chemical etching, and mechanical abrasing, a circumferential slot around the adhesion layer and thereby electrically separate the opposing ends of the adhesion layer from each other thereby restoring capacitance and forming a slotted body.

* * * * *